(12) United States Patent
Bouteiller et al.

(10) Patent No.: US 10,941,074 B2
(45) Date of Patent: Mar. 9, 2021

(54) COMPOSITION FOR PLASTERBOARDS AND PRODUCTS OBTAINED

(71) Applicant: CertainTeed Gypsum, Inc., Malvern, PA (US)

(72) Inventors: Bernard Bouteiller, Miramas (FR); Sylvain Petigny, Velleron (FR); Yves Boussant-Roux, Montfavet (FR)

(73) Assignee: CertainTeed Gypsum, Inc., Malver, PA (US)

( * ) Notice: Subject to any disclaimer, the term of this patent is extended or adjusted under 35 U.S.C. 154(b) by 468 days.

(21) Appl. No.: 14/650,411

(22) PCT Filed: Dec. 18, 2013

(86) PCT No.: PCT/FR2013/053157
§ 371 (c)(1),
(2) Date: Jun. 8, 2015

(87) PCT Pub. No.: WO2014/096698
PCT Pub. Date: Jun. 26, 2014

(65) Prior Publication Data
US 2015/0307397 A1 Oct. 29, 2015

(30) Foreign Application Priority Data
Dec. 21, 2012 (FR) ...................... 12 62531

(51) Int. Cl.
*C04B 11/00* (2006.01)
*B28B 1/16* (2006.01)
*E04C 2/04* (2006.01)
*C04B 28/14* (2006.01)
*C04B 111/28* (2006.01)

(52) U.S. Cl.
CPC ................ *C04B 11/00* (2013.01); *B28B 1/16* (2013.01); *C04B 28/14* (2013.01); *E04C 2/043* (2013.01); *C04B 2111/28* (2013.01)

(58) Field of Classification Search
CPC ... C04B 2111/28; C04B 28/14; C04B 14/303; C04B 14/202; C04B 14/46; C04B 20/0008; C04B 20/008; C04B 20/0092; C04B 11/00; E04C 2/043; B28B 1/16
See application file for complete search history.

(56) References Cited

U.S. PATENT DOCUMENTS

2003/0138614 A1* 7/2003 Leclercq .................. C04B 14/10
428/292.1
2008/0245012 A1* 10/2008 Boisvert ................. B32B 13/08
428/312.4

FOREIGN PATENT DOCUMENTS

| CN | 101318796 | * | 12/2008 |
| CN | 101318796 A | | 12/2008 |
| JP | H09142952 | * | 6/1997 |
| JP | 11-021125 | * | 1/1999 |
| KR | 10-2009-0131120 A | | 12/2009 |
| WO | WO 02/06180 A1 | | 1/2002 |

OTHER PUBLICATIONS

International Search Report dated Jan. 31, 2014, in PCT/FR2013/053157, filed Dec. 18, 2013.

* cited by examiner

*Primary Examiner* — Shuangyi Abu Ali
(74) *Attorney, Agent, or Firm* — Mcdonnell Boehnen Hulbert & Berghoff LLP

(57) ABSTRACT

The invention relates to a plaster-based composition comprising nanometric boehmite and/or nanometric aluminium trihydroxide, this composition making it possible to obtain products having better dimensional stability at high and in particular at very high temperature. The invention also relates to the method of obtaining the products, and the products produced.

6 Claims, No Drawings

COMPOSITION FOR PLASTERBOARDS AND PRODUCTS OBTAINED

The present invention relates to a plaster-based composition that can be used for forming building products, in particular that can be used for forming plasterboards or plaster tiles notably intended for forming and/or covering partitions or ceilings of buildings, or for forming joints, etc. The invention also relates to the use of such a composition for manufacturing said products, as well as the products obtained.

The raw material of the plaster-based compositions used for manufacturing building products is a calcium sulphate dihydrate (or gypsum), of natural origin or synthetic. This calcium sulphate, in the form of powder, generally undergoes a calcining operation which dehydrates it to calcium sulphate hemihydrate or to anhydrous calcium sulphate or to a mixture of these two forms, this dehydrated product commonly being called plaster. On mixing this plaster with water, a mix is obtained, which solidifies, forming calcium sulphate dihydrate again. With these successive steps of dehydration and rehydration, the plaster can be moulded, shaped to obtain various shapes, notably boards (commonly called plasterboards, by extension), or else joints, etc. These boards are generally formed of a plaster-based core, and this core can be coated if required with one or more layers, for example for protection and/or for reinforcement, notably with a reinforcing sheet (for example fibre-based or of cardboard) on each face.

The plasterboards as well as the joints produced must meet various requirements connected with their use in building construction, and in particular they must comply with the regulatory requirements relating to fire resistance.

In order to improve this resistance, it is notably known for plasterboards to supplement the plaster composition with various additives, making it possible if necessary to limit or delay the dimensional change (or shrinkage) of the boards under the action of heat, such as vermiculite, perlite, crystalline silica, or else additives in the form of clay materials, compounds of boron or of silicon or of aluminium, etc. Nevertheless, the application of certain additives can prove challenging, or these additives can lead to considerable extra cost, and moreover there may only be a slight improvement in fire resistance.

It is also known and usual to incorporate glass fibres in plasterboards notably in order to maintain the cohesion of the core in case of shrinkage under the action of heat. However, the incorporation and manipulation of glass fibres make the manufacture of the boards more complex and expensive.

Furthermore, there are applications that demand greater fire resistance than that of the plasterboards used conventionally.

The aim of the present invention was therefore to develop an improved plaster-based product, in particular of the plasterboard or plaster tile or joint type, having particularly satisfactory dimensional stability at high temperature and more especially at very high temperature, yet remaining simple to make, and depending on circumstances this product requires less glass fibre or even can be made without glass fibre yet retains good dimensional stability at high and at very high temperature.

This aim is achieved with the plaster-based composition according to the invention, characterized in that it comprises (as additive, making it possible to improve dimensional stability/limit shrinkage at high temperature, in particular at very high temperature) nanometric boehmite and/or nanometric aluminium trihydroxide. Advantageously, said composition comprises (initially) in percentages by weight (or percentages by mass) relative to the dry total mixture:
- from 55 to 99.9 wt %, in particular from 55 to 98 wt %, of plaster,
- from 0.1 to 10 wt % of nanometric boehmite and/or of nanometric aluminium trihydroxide.

Unless stated otherwise in the present invention, the percentages by weight are given relative to the dry total mixture (or dry extract, the dry total mixture notably comprising plaster, boehmite and/or aluminium trihydroxide, and optionally vermiculite, fibres and one or more additives as mentioned hereunder), i.e. the mixture devoid of (or after extraction of) any liquid medium possibly serving for dispersion of the components, in particular devoid of water. The composition is formed from the components indicated, (generally mixed) in the proportions given relative to the dry mixture.

The composition can also comprise one or more additives and/or additional components usually employed in this field and/or facilitating application of the composition and/or improving its resistance, notably fire resistance, and/or improving other properties, as stated hereunder. In particular the composition can also comprise:
- from 0 to 10 wt % of at least one or more additives (notably such as stated hereunder) selected in particular from vermiculite, mineral and/or refractory fibres, silica, clay (other possible additives such as surfactants, setting retarders or accelerators, etc. also being listed hereunder), etc.

The present invention also relates to the preparation of a plaster-based composition ("fireproofed", or having improved behaviour in fire, notably in the sense that it has better dimensional stability at high temperature), comprising a step consisting of preparing a mixture based (at least) on plaster and nanometric boehmite and/or nanometric aluminium trihydroxide and/or of adding nanometric boehmite and/or nanometric aluminium trihydroxide to a plaster-based composition. It also relates to a method of manufacturing an element of construction (in particular of small thickness relative to its area, such as a board) using the composition according to the invention, and according to which a plaster-based composition is formed by mixing (according to the preceding step of preparation), comprising nanometric boehmite and/or nanometric aluminium trihydroxide, then said composition is formed, in particular by extrusion and/or moulding, before optional drying. The invention also relates to a method of fireproofing a product based on gypsum/plaster, formed from a plaster-based composition, in which nanometric boehmite and/or nanometric aluminium trihydroxide is/are added to said plaster-based composition. In the methods mentioned above, addition of nanometric boehmite and/or of nanometric aluminium trihydroxide (at a preferred rate from 0.1 to 10 wt % of nanometric boehmite and/or of nanometric aluminium trihydroxide relative to the dry total mixture forming the composition) can if required be effected initially in the plaster-based mixture or subsequently in the composition before the definitive forming of the part of the product (generally the product core) based on this composition.

The present invention also relates to the element of construction (for example board or joint) obtained from the composition and/or one or other of the above methods and having improved fire resistance. The present invention also relates more generally to the use of nanometric boehmite and/or nanometric aluminium trihydroxide (notably use of the composition described above) for manufacturing plaster-based products.

The present invention has demonstrated that the addition of nanometric boehmite and/or of nanometric aluminium trihydroxide to a plaster-based composition makes it possible to endow a product (based on gypsum), prepared from this composition, with improved properties of fire stability or resistance, notably dimensional stability at high temperature, and more especially at very high temperature (above 850° C., in particular above 900° C., or even above 1000° C.), and in particular makes it possible to replace advantageously (the more so if the performance is evaluated at very high temperature) some or all of the components usually added for improving fire resistance, such as glass fibre, or vermiculite (which in some circumstances do not give sufficient dimensional stability at very high temperature).

Hereinafter in the present invention, plaster notably means a hydratable calcium sulphate (for example obtained by calcining a gypsum), constituted in particular (notably primarily or entirely) of calcium sulphate hemihydrate, regardless of its crystalline form, and/or optionally of anhydrous calcium sulphate, where these components can be of natural or synthetic origin, and this hydratable calcium sulphate can also include some impurities such as $SiO_2$, MgO, etc. It is notably possible to use any plaster suitable for preparing conventional plasterboards.

Boehmite means an aluminium oxide hydroxide (also called aluminium monohydrate, or also aluminium oxide (mono)hydroxide) of formula AlO(OH) (in particular the gamma polymorph); aluminium trihydroxide means an aluminium (tri)hydroxide (also called alumina (tri)hydrate, or also aluminium oxide (tri)hydrate) of formula $Al(OH)_3$; nanometric component (boehmite and/or aluminium trihydroxide) means particles (of or forming this component) having a dimension or size below 950 nanometres, preferably below 750 nm, and notably below 500 nm, regardless of the shape of these particles.

Size of a particle means its equivalent diameter, i.e. the diameter of the sphere that would behave identically during granulometric analysis of the particles (or of the powder formed from said particles) forming (initially) the component in question, the granulometric distribution (set of particle sizes) being measured in particular by laser granulometry.

In the present invention, x wt % of nanometric component (boehmite and/or aluminium trihydroxide) signifies that the composition incorporates x wt % of particles of this component having a size below 950 nm (preferably below 750 nm, and notably below 500 nm), but other particles of this component of larger size can be present in the composition (in other words, x % of nanometric component signifies x % of particles (of this component) that are nanometric/of size below 950 nm). If applicable, the size distributions are given using the D10, D50 or D90 percentiles; Dy signifies that y % of the particles of the set of particles under consideration (or of the powder under consideration) have a size below Dy, and (100-y) % have a larger size.

As already stated, the size of the particles is measured by laser granulometry, for example using a granulometer marketed under the reference Partica LA-950 by the company Horiba, the powders being analysed in water, without using ultrasound.

As already stated, addition of nanometric boehmite or of nanometric aluminium trihydroxide gives a significant improvement in fire resistance and/or a significant decrease in the amount of usual components such as glass fibre or vermiculite (used until now for this purpose, at rates for example of the order of 0.8% for glass fibre and of the order of 3% for vermiculite, with the drawbacks seen above), such an improvement not being obtained when using other compounds based on aluminium of different formula and/or having a larger particle size (for example of the order of several microns), the effect obtained with these other compounds being significantly less, or even negligible in the absence of other components or additives promoting the desired effect. Addition of nanometric boehmite is likewise particularly preferred in relation to addition of aluminium trihydroxide in the present invention.

Preferably, the content of nanometric boehmite and/or of nanometric aluminium trihydroxide in the plaster composition defined according to the invention is above 0.2%, notably above 0.3%, in particular above 0.4%, or even above 0.5 wt %, or even above 0.7 wt %. Also preferably, the content of one and/or other of these compounds is below 8%, notably below 7%, in particular below 6%, or even below 5%, or even below 4% or 3%, or even, depending on circumstances, below 2.5 wt %.

Moreover, the size of the particles of nanometric boehmite and/or of nanometric aluminium trihydroxide is advantageously below 750 nanometres, or even below 500 nm, or even below 400 nm, notably below 300 nm, in particular below 200 nm. It is also advantageously above 20 nm, notably above 50 nm, in particular above 60 nm, or even above 80 nm.

Also preferably, the form factor (defined as the ratio L/I of the largest dimension L to the largest dimension I in the plane perpendicular to L) of the particles of nanometric boehmite and/or of nanometric aluminium trihydroxide is below 15, in particular below 10, this factor also preferably being greater than 2, notably greater than 3. In particular, the particles of nanometric boehmite and/or of nanometric aluminium trihydroxide are advantageously in the form of small plates of roughly parallelepipedal shape. The shape of the particles is notably determined using a scanning electron microscope.

In an especially preferred embodiment, the composition according to the invention comprises from 0.5 to 6 wt % of particles of boehmite having a size below 750 nm, preferably of size between 20 and 500 nm.

Nanometric boehmite is particularly preferred in the present invention for obtaining the desired boards notably having a particularly satisfactory dimensional stability at very high temperature.

The plaster-based composition is generally prepared by mixing the various components to obtain a powder (notably dispersible in water before use) or a more or less fluid paste (notably a composition ready for use), the components being in solid form or notably in the form of suspension or dispersion, and water being added if required. The plaster-based composition (obtained) according to the invention can thus be in solid form (powder, etc.) or in liquid form (dispersion, etc.).

The boehmite (or the aluminium trihydroxide) can notably be added to the mixture or to the paste in the form of powder (in particular with particles having a size below 950 nm) or in the form of colloidal suspension (dispersion in water or an acid notably). According to an advantageous embodiment, this additive (boehmite and/or aluminium trihydroxide) is added in the form of colloidal suspension comprising for example between 5 and 50% of nanometric boehmite and/or of nanometric aluminium trihydroxide, and between 50 and 95 wt % of a medium such as water or an acid.

As already mentioned, the plaster used can be any usual plaster; it can be in the form of powder or already in the form of paste formed by mixing with water. More broadly, the mixture to which the nanometric boehmite and/or nanometric aluminium trihydroxide is added can be any pre-existing mixture based on plaster, incorporating other additives if necessary. The proportion of plaster in the composition is at least 55 wt % in order to obtain sufficient mechanical strength.

Water is added to the composition according to the invention as required in order to allow its application and its transformation to obtain, for example, an element of construction (such as a board). Depending on circumstances, at least a proportion of the water can be added in the form of foam (or optionally foaming can be effected in the liquid composition) notably in order to reduce the weight of the plasterboard. Various types of foaming agents can be added to obtain the foam, such as ionic surfactants and/or non-ionic surfactants, their proportion being for example between 0.01 and 2 wt % of the composition.

In addition to the plaster, the nanometric boehmite and/or the nanometric aluminium trihydroxide, and the (aqueous) medium/media present if necessary, the composition according to the invention can also comprise vermiculite. Vermiculite (formed in particular from a silicate of aluminium, of iron, of magnesium and of potassium) can be expanded or not and contributes to improving the fire resistance of the products obtained. Preferably, the proportion of vermiculite (especially non-expanded) remains below 10 wt % of the composition.

The composition according to the invention can also comprise fibres, in particular mineral and/or refractory fibres, said fibres preferably being glass fibres. These fibres can be short (of the order of 3 to 6 mm on average), long (of the order of 10 to 24 mm on average), or of intermediate size. They can be in non-bound form or in the form of a network of interwoven fibres, such as a mat of fibres or a cloth. These fibres contribute to increasing the mechanical strength of the products obtained, in particular at high temperature. Preferably, the proportion of fibres remains below 10 wt % of the composition. Alternatively or jointly, fibres (in the form of film, cloth, mat, etc.) or other reinforcements (cardboard sheet, etc.) can be provided in the products obtained from the composition according to the invention, notably in the boards, for example on the surface of the plaster composition that has been formed and optionally hardened, in order to reinforce the final product obtained.

Other additives or components can also be present in the composition according to the invention (possibly supplied together with certain other components or added to the composition independently). These additives can be for example one or more of the following agents: water-repellent agent (silicone, oil, wax, starch, polymer for example of the polyvinyl alcohol (PVOH), polyvinyl acetate (PVAc), styrene-butadiene (SBR) type, etc.), setting accelerator (fine gypsum powder, potassium sulphate, etc.) or setting retarder (of the protein or carboxylic acid type for example), distortion inhibitor or anti-slumping agent (starches, cellulose ethers, polymers such as PVOH, PVAc, SBR, etc.), recalcination inhibitor (such as sugar, starch, boric acid, etc.), foam stabilizer, surfactant or foaming agent, binder, bactericide, fungicide, biocidal agent, pH adjuster, colourant, flame retarder and/or filler, tackifier or reinforcing agent or protective agent (for example starch (native or not pregelatinized)), liquefying or dispersing agent (lignosulphonate, melamine formaldehyde, polycarboxylate, etc.), thickener, self-levelling agent, or also one or more other additives usually employed in plaster compositions, etc. Calcium carbonate $CaCO_3$ may also be present depending on circumstances, notably in compositions intended for the formation of joints (joints used notably between plasterboards).

As already mentioned, the invention also relates to the use of a composition according to the invention for manufacturing an object, for example moulded or extruded, in particular for manufacturing a plaster tile or plasterboard, or else for manufacturing joints, and relates to the objects (moulded or extruded) such as tiles or boards or joints, comprising (or obtained from) such a composition.

The plaster boards (or tiles or panels) are for example obtained by a process, preferably continuous, comprising the following steps:
  preparing a paste by mixing the various constituents of the plaster composition as already mentioned (this composition being intended to form the core of the board), for example in a mixer;
  depositing this paste on a (first) reinforcing material (for example such as cardboard(s) and/or network(s) of wires) or casting in a mould,
  depositing a (if necessary second) reinforcing material (identical or if necessary different from the first reinforcing material) on the paste (notably on its upper face),
  optional drying.

At the end of the process, a board is thus obtained in which the core is a gypsum-based (initially plaster-based) composition.

Other steps can also be provided, such as a step of cutting up the boards, etc.

The invention also relates to the joints or the plasterboards (or the tiles) obtained, the dimensions of the boards generally varying depending on their intended use. As an example, plasterboards intended for manufacturing partitions can reach a length of 5 m and a width of 1.20 m and their thickness can vary between 6 and 35 mm. These boards generally have a density between 0.5 and 2.0 g/cm$^3$, preferably between 0.6 and 1.0 g/cm$^3$.

These boards can be provided with reinforcement(s) (notably based on mineral or refractory or cellulose fibres) on the surface, for example in the form of film(s), cloth(s), paper(s), mat(s), grid(s), etc. or a combination of these various reinforcing elements.

It is observed that the products according to the invention are enriched with aluminium (observation by chemical analysis), have nodules, constituted in particular of aluminium and of oxygen, intermingled with the gypsum structure (observation by scanning electron microscope), and show a weight loss in the region of 220-320° C. for the products based on aluminium trihydroxide and in the region of 400-500° C. for the products based on boehmite (observation by thermogravimetric analysis (TGA)).

The present invention will be better understood and other details and advantageous features of the invention will become clear on reading the following examples, given for purposes of illustration and non-limiting.

Preparation of the samples and measurements for examples 1 to 11 according to the invention and reference examples 1 to 6:

Plasterboards of 20 cm×25 cm were prepared by mixing 100 parts by weight of plaster with 0.6 parts of starch (sold under reference Cargill C Plus by the company Cargill) and if necessary with the dry materials (in amounts also expressed in parts by weight (per 100 parts by weight of plaster)) given in Tables 1 to 3 below, and with demineralized water, and then by adjusting the density of the mixture with foamed water (obtained by mixing water and about 1 wt %, relative to the water, of foaming agent based on sodium alkyl ether sulphate marketed under reference Millifoam C by the company Huntsman Corporation) to obtain boards having a density of 0.85±0.02 after drying for 19 minutes in a microwave oven (at a power of 750 W) and then for about hours in a stove at 40° C. (in order to obtain complete hardening of the boards).

Samples of parallelepipedal shape, with length equal to 200 mm and width equal to 150 mm, were taken (notably by cutting) and were put in a furnace with a programmed rate of temperature increase according to standard ISO834, the dimensional change of the width of the sample being recorded continuously. After about 13 minutes, when the temperature reached 700° C., the shrinkage of the sample R700 was measured if applicable. After 60 minutes, when the temperature reached 945° C., the shrinkage of the sample R945 was measured. After 120 minutes, when the temperature reached 1049° C., the shrinkage of the sample R1049 was measured.

The results obtained at very high temperature from the following compositions are compared in Table 1, which gives the values of shrinkage (or dimensional change) expressed in percentages.

REFERENCE EXAMPLE 1

No dry matter was added to the aforementioned composition of plaster, starch and water.

REFERENCE EXAMPLE 2

3 parts by weight of crude vermiculite with size mainly between 250 and 710 μm (sold under the reference Vermiculite grade Micron by the company EFISOL) was added to the composition (before adjusting the density of the mixture).

An improvement in dimensional stability at temperatures reaching 945 and 1049° C. was observed (Table 1) on adding the vermiculite.

REFERENCE EXAMPLE 3

The procedure in reference example 2 was followed, this time adding 5 parts by weight (instead of 3) of vermiculite.

However, measurements of shrinkage could not be carried out (ND signifying not determinable), as the specimens collapsed during the test.

REFERENCE EXAMPLE 4

Instead of increasing the vermiculite as in the preceding example, the procedure in reference example 2 was followed, this time adding 0.8 parts by weight of glass fibres with a length of 12 mm sold under the reference Duracore SF Plus type M300 by the company Johns Mansville, and 2.5 parts by weight of the liquefying agent (in the form of a sodium salt of a polynaphthalene sulphonic acid) sold under the reference Prolétor PNS 747L by the company Protex.

An improvement in dimensional stability for temperatures reaching 945° C. was observed on adding the fibres in addition to vermiculite, but conversely this addition of fibres was without consequences at higher temperature.

EXAMPLE 1

According to the Invention

Instead of increasing the vermiculite as in reference example 3 or adding fibres as in reference example 4, the procedure in reference example 2 was followed, this time adding 1 part by weight (per 100 parts by weight of plaster), or about 0.96 wt % relative to the total dry composition (or total dry mixture), of nanometric boehmite (incorporated in the form of a colloidal suspension comprising from 7 to 9 wt % of boehmite, and called B1-sol in the tables) formed from particles (all) having a size below 500 nm (and in particular a high proportion of particles smaller than 200 nm), these particles being in the form of small plates notably having a form factor of the order of 10.

We observed a significant improvement in dimensional stability at very high temperature (above 900° C.—here at 945° C.—, or even above 1000° C.—here at 1049° C.) of the products according to the invention relative to those obtained from mixtures using only vermiculite and/or glass fibres for improving the dimensional stability. This example also shows that it is possible if necessary to reduce or omit the fibres for improving the dimensional stability at high and very high temperature owing to the solution according to the present invention.

EXAMPLE 2

According to the Invention

The procedure in reference example 4 was followed, reducing the proportion of vermiculite and adding 1 part by weight of nanometric boehmite 'B1-sol' mentioned in example 1 (i.e. at least about 0.94 wt % of nanometric boehmite relative to the dry total mixture).

Once again, a significant improvement in dimensional stability at very high temperature was observed, relative to the mixture in reference example 4 comprising more vermiculite and not comprising B1-sol. Adding the nanometric boehmite according to the invention therefore also makes it possible to reduce (or even eliminate) the vermiculite used, while preserving and improving the dimensional stability of the products at very high temperature.

EXAMPLE 3

According to the Invention

The procedure in reference example 4 was followed, adding 5 parts by weight (per 100 parts by weight of plaster) of aluminium trihydroxide $Al(OH)_3$ sold under the reference APYRAL 200 by the company Nabaltec (and called ATH3 in Table 1) and having a D50 of (size of 50% of the particles below) about 600 nanometres (or at least about 2.2 wt % of nanometric aluminium trihydroxide relative to the total dry mixture), about 35 wt % of the particles being smaller than 500 nm.

Once again, a significant improvement in dimensional stability at very high temperature was observed, relative to the mixture in reference example 4.

TABLE 1

|  | ref. 1 | ref. 2 | ref. 3 | ref. 4 | ex. 1 | ex. 2 | ex. 3 |
|---|---|---|---|---|---|---|---|
| Vermiculite |  | 3 | 5 | 3 | 3 | 1.5 | 3 |
| Fibres |  |  |  | 0.8 |  | 0.8 | 0.8 |
| Liquefying agent |  |  |  | 2.5 |  | 2.5 | 2.5 |
| B1 sol |  |  |  |  | 1 | 1 |  |
| ATH 3 |  |  |  |  |  |  | 5 |
| R945 | 7.2 | 6.2 | ND | 4.9 | 4.4 | 3.9 | 4.0 |
| R1049 | 18.6 | 13.5 | ND | 13.8 | 10.7 | 10.8 | 8.8 |

Table 2 compares the results obtained with the following compositions using various presentations of nanometric boehmite, the foregoing reference example 4 also being taken for comparison, this table giving the shrinkage values expressed as percentages.

EXAMPLE 4

According to the Invention

The procedure in the preceding reference example 4 was followed, adding 1 part by weight of nanometric boehmite powder (called B3 powder in the table) having particles in the form of spheres (all) having a size below 500 nm (and in particular a high proportion of particles smaller than 200 nm), or at least about 0.93 wt % of nanometric boehmite relative to the dry total mixture, these particles having a form factor of the order of 1.

EXAMPLE 5

According to the Invention

The procedure of example 4 was followed, replacing the powder B3 with the same proportion of another nanometric boehmite powder (called B2 powder in the table) this time having rod-shaped particles (all) having a size below 500 nm (and in particular a high proportion of particles smaller than 200 nm), these particles having a form factor of the order of 2.

EXAMPLE 6

According to the Invention

The procedure in example 4 was followed, replacing the powder B3 with the same proportion of another nanometric boehmite powder (called B1 powder in the table) this time having particles in the form of small plates (all) having a size below 500 nm (and in particular a high proportion of particles smaller than 200 nm), these particles having a form factor of the order of 10.

EXAMPLE 7

According to the Invention

The procedure in example 4 was followed, replacing the powder B3 with the same proportion of the nanometric boehmite 'B1-sol' seen previously.

An improvement in dimensional stability at high and very high temperature of the products obtained from the compositions according to the invention was observed, relative to those obtained from the mixture in reference example 4, even greater when the form factor is greater than 2, and improved as well when the boehmite is added in the form of colloidal suspension, compared to addition in the form of powder.

TABLE 2

|  | ref. 4 | ex. 4 | ex. 5 | ex. 6 | ex. 7 |
|---|---|---|---|---|---|
| Vermiculite | 3 | 3 | 3 | 3 | 3 |
| Fibres | 0.8 | 0.8 | 0.8 | 0.8 | 0.8 |
| Liquefying agent | 2.5 | 2.5 | 2.5 | 2.5 | 2.5 |
| B1 sol |  |  |  |  | 1 |
| B1 powder |  |  |  | 1 |  |
| B2 powder |  |  | 1 |  |  |
| B3 powder |  | 1 |  |  |  |
| R700 | 1.5 | 1.1 | 1.1 | 0.7 | 1.1 |
| R945 | 4.9 | 4.6 | 4.1 | 3.6 | 3.6 |
| R1049 | 13.8 | 13.0 | 11.3 | 11.6 | 9.8 |

Table 3 compares the results obtained from the following compositions using different proportions of nanometric boehmite (returning to example 1 according to the invention, seen previously, as the starting point), and once again these results were compared with those obtained with non-nanometric aluminium trihydroxide or non-nanometric boehmite, this table giving the values of shrinkage expressed in percentages.

EXAMPLE 8

According to the Invention

The procedure in example 1 was followed, this time adding 2 parts by weight (instead of 1 part) of nanometric boehmite B1-sol, or about 1.9 wt % of nanometric boehmite relative to the total dry mixture.

EXAMPLE 9

According to the Invention

The procedure in example 1 was followed, this time adding 3 parts by weight (instead of 1 part) of nanometric boehmite B1-sol, or about 2.81 wt % of nanometric boehmite relative to the total dry mixture.

EXAMPLE 10

According to the Invention

The procedure in example 1 was followed, this time adding 5 parts by weight (instead of 1 part) of nanometric boehmite B1-sol and adding 0.6 parts by weight of the liquefying agent (for adjusting the viscosity) used in reference example 4, all the vermiculite moreover being removed from the composition, or about 4.71 wt % of nanometric boehmite in the composition relative to the total dry mixture.

It was observed with examples 1, 8, 9 and 10 according to the invention that the improvement in dimensional stability at very high temperature is all the greater as the proportion of boehmite (in this case colloidal) in the composition according to the invention increases. As in Table 1, it was also observed that in parallel, the addition of nanometric boehmite makes it possible to reduce (or even eliminate) the vermiculite used, while preserving and improving the dimensional stability of the products at very high temperature.

EXAMPLE 11

According to the Invention

The procedure in example 10 was followed, replacing the nanometric boehmite B1-sol with the same proportion of a boehmite in the form of powder (called B4 powder in the table), this time having a D50 of about 2.7 µm, about 20 wt % of the particles of this boehmite having a size below 750 nm (or at least about 0.94 wt % of nanometric boehmite relative to the dry total mixture), the liquefying agent having been removed as superfluous.

REFERENCE EXAMPLE 5

The procedure in example 11 was followed, replacing boehmite B4-powder with an aluminium trihydroxide Al(OH)$_3$, marketed under the reference SH500 by the company Alcan (and called ATH1 in Table 3), having a D50 of about 50 to 60 microns and not having particles smaller than 1 micron.

REFERENCE EXAMPLE 6

The procedure in example 1 was followed, replacing the nanometric boehmite with a boehmite marketed under the reference PURAL NF by the company Sasol (and called B5 powder in Table 3), having a D50 of about 8-10 microns and not having particles smaller than 1 micron.

A marked improvement in dimensional stability at very high temperature was observed for the products according to the invention relative to the products obtained from compositions using non-nanometric boehmite or non-nanometric aluminium trihydroxide (i.e. formed from particles with size greater than that considered in the present invention).

TABLE 3

|  | ex. 1 | ex. 8 | ex. 9 | ex. 10 | ex. 11 | ref. 5 | ref. 6 |
|---|---|---|---|---|---|---|---|
| Vermiculite Fibres | 3 | 3 | 3 |  |  |  | 3 |
| Liquefying agent |  |  |  | 0.6 |  |  |  |
| B1 sol | 1 | 2 | 3 | 5 |  |  |  |
| B4 powder |  |  |  |  | 5 |  |  |
| ATH1 |  |  |  |  |  | 5 |  |
| B5 powder |  |  |  |  |  |  | 1 |
| R945 | 4.4 | 3.8 | 3.4 | 2.6 | 4.6 | 6.6 | 8.0 |
| R1049 | 10.7 | 9.1 | 6.9 | 3.5 | 7.9 | 16.9 | 17.6 |

EXAMPLE 12

According to the Invention

In order to test a composition intended for the formation of plasterboard joints, plasterboards of 20 cm by 25 cm were prepared by mixing 100 parts by weight of a dry mixture comprising 71.1 wt % of plaster, 24.0 wt % of calcium carbonate and 4.9 wt % of B3 powder (described in example 4) with 48 parts of demineralized water to obtain boards having a density of 1.12±0.02 after drying for 48 h in the open air.

Samples of parallelepipedal shape, with length equal to 200 mm and width equal to 150 mm, were taken (notably by cutting) and were put in a furnace with a programmed rate of temperature increase according to standard ISO834, the dimensional change of the width of the sample being recorded continuously. After 60 minutes, when the temperature reached 945° C., the shrinkage of the sample R945 was measured. The shrinkage value obtained was 3.1%. After 120 minutes, when the temperature reached 1049° C., the shrinkage of the sample R1049 was measured. The shrinkage value obtained was 4.9%.

REFERENCE EXAMPLE 7

The procedure of example 12 was followed, replacing the dry mixture with a mixture comprising 75 wt % of plaster and 25 wt % of calcium carbonate. The shrinkage values obtained were 6.8% for R945 and 9.2% for R1049.

A strong improvement in dimensional stability at very high temperature for the products according to the invention was thus observed, relative to the products obtained from compositions not using nanometric boehmite or nanometric aluminium trihydroxide.

The composition according to the invention can notably be used advantageously for obtaining fire-resistant plasterboard and intended for forming and/or covering partitions or ceilings of buildings.

The invention claimed is:

1. A plaster-based composition comprising:
   from 55 to 99.4 wt % hydratable calcium sulfate based on the dry weight of the plaster-based composition; and
   from 0.6 to 6 wt % particles of nanometric boehmite having a particle size between 20 and 500 nm based on the dry weight of the plaster-based composition, wherein the plaster is a gypsum plaster.

2. The plaster-based composition of claim 1, wherein the plaster-based composition is free of vermiculite fibers, mineral fibers, and refractory fibers.

3. The plaster-based composition of claim 1, wherein a form factor of the particles of nanometric boehmite is in a range of 3-10.

4. The plaster-based composition of claim 1, wherein the plaster-based composition further comprises starch.

5. The plaster-based composition of claim 1, wherein the particles of nanometric boehmite are in a form of plates having parallelpipedal shape.

6. The plaster-based composition of claim 1, wherein the nanometric boehmite is incorporated in a form of a colloidal suspension or in the form of a powder.

* * * * *